(12) United States Patent
Prabhu et al.

(10) Patent No.: US 11,747,509 B2
(45) Date of Patent: Sep. 5, 2023

(54) THREE-DIMENSIONAL X-RAY BAGGAGE SCANNER

(71) Applicant: VEHANT TECHNOLOGIES PRIVATE LIMITED, Noida (IN)

(72) Inventors: Anoop G Prabhu, Noida (IN); Rajeev Ranjan Dixit, Noida (IN); Kapil Bardeja, Noida (IN)

(73) Assignee: VEHANT TECHNOLOGIES PRIVATE LIMITED, Noida (IN)

( * ) Notice: Subject to any disclaimer, the term of this patent is extended or adjusted under 35 U.S.C. 154(b) by 178 days.

(21) Appl. No.: 17/272,305

(22) PCT Filed: Aug. 29, 2019

(86) PCT No.: PCT/IN2019/050628
§ 371 (c)(1),
(2) Date: Feb. 27, 2021

(87) PCT Pub. No.: WO2020/044376
PCT Pub. Date: Mar. 5, 2020

(65) Prior Publication Data
US 2021/0181369 A1   Jun. 17, 2021

(30) Foreign Application Priority Data

Aug. 30, 2018   (IN) .............................. 201811032446

(51) Int. Cl.
*G01V 5/00*   (2006.01)
(52) U.S. Cl.
CPC ................................ *G01V 5/0041* (2013.01)
(58) Field of Classification Search
CPC .... G01V 5/0041; G01V 5/005; G01V 5/0016; G01V 5/0066; G01V 5/0025;
(Continued)

(56) References Cited

U.S. PATENT DOCUMENTS

| 7,965,816 B2* | 6/2011 | Kravis | G01V 5/0016 |
| | | | 378/57 |
| 10,254,436 B2* | 4/2019 | Awad | G01V 5/0058 |

(Continued)

OTHER PUBLICATIONS

Uday Kumar et al.: "A Study Report on X-Ray Sensor Amplifier PCB for X-Ray Baggage Inspection System (XBIS)", International Journal of Engineering and Computer Science, vol. 2, No. 6, Jun. 30, 2013 (Jun. 30, 2013), Gajraula, pp. 1861-1867, XP055689246 See also references of EP 3844487A4 (Year: 2013).*

*Primary Examiner* — Irakli Kiknadze (57) ABSTRACT

A system for scanning an object 112 is provided. The system includes a continuous conveyor belt 102, a first electromagnetic radiation sensor 104, a second electromagnetic radiation sensor, a tunnel 106, an electromagnetic radiation generator 108, a third electromagnetic radiation sensor, a fourth electromagnetic radiation sensor 110 and a processor. The continuous conveyor belt 102 receives the object 112 and moves the object 112 in forward direction. The first electromagnetic radiation sensor scans the object 112 that is travelling through the continuous conveyor belt 102. The tunnel 106 receives the object 112 from the continuous conveyor belt 102 after scanned through the first electromagnetic radiation sensor 104. The second electromagnetic radiation sensor is positioned inside the tunnel 106 at entry point. The electromagnetic radiation generator 108 receives a second signal from the second electromagnetic radiation sensor to generate an angular beam of electromagnetic radiation on the object 112.

7 Claims, 9 Drawing Sheets

(58) Field of Classification Search
CPC .. G01V 5/0075; G01V 5/0058; G01V 5/0091; G01V 5/00; G01V 5/0008; G01N 23/04; G01N 23/046; G01N 2223/419; G01N 23/083; G01N 23/06; G01N 23/02; G01N 23/20083; G01N 23/20; G01N 23/223; G01N 2223/076; G01N 23/087; A61B 6/482; A61B 6/405; A61B 6/032; A61B 6/466; A61B 6/027; A61B 6/4007; A61B 6/4028; A61B 6/00; G01T 7/08; G01T 1/20; G01T 1/2018; G01T 3/06; G06T 5/00; G06T 5/009; G06T 15/005; H01J 35/1017; F16M 13/02; H04N 13/122; H04N 13/189; H04N 13/243; H05H 7/22; H05H 9/00
USPC ...................................................... 378/57, 62
See application file for complete search history.

(56) References Cited

U.S. PATENT DOCUMENTS

2006/0098773 A1* 5/2006 Peschmann ............ G01N 23/04
378/57
2011/0211666 A1* 9/2011 Ying ...................... A61B 6/482
977/950

\* cited by examiner

THREE-DIMENSIONAL X-RAY BAGGAGE SCANNER

BACKGROUND

Technical Field

The embodiments herein generally relate to an X-ray scanner, in particular to a system and method of scanning and generating a three-dimensional image of items present inside an object.

Description of the Related Art

X-ray scanning has wide range of application in many fields. Especially in security check points, X-ray scanning systems are widely used. While performing security scanning, it is necessary that viewer has to get a clear idea of what is inside the object being scanned. There are several X-ray scanning systems are available in the market.

Traditional single view x-ray scanning systems uses a single x ray beam for scanning of the object passing through the scanning system. After processing the data, the single view x-ray scanning system produces two-dimensional (2D) image of the object from the bottom or top. Traditional single view x-ray scanning system also indicates the density of the material through different standard color coding for organic, non-organic and metallic substances. The 2D images produced by these systems only provide spatial information in two dimensions. Information about the third dimension, depth, is lost in these traditional systems. Hence, this can lead to misinterpreted information and in many cases, serious lapses while performing security scanning using these traditional single view scanners.

There are systems being developed to capture information about three dimension and different views of the same object by using multiple X ray beams through multiple X ray generators and detector assemblies. These systems are well proven and established by the name of Dual or Multi-View X-ray Inspection systems. But as mentioned the multiple beams require a different and larger setup altogether which will further link up to heavy structures and more sophistication in handling the radiation part.

Accordingly, there remains a need for a system and method of scanning and generating a three-dimensional image of an object.

SUMMARY

In view of the foregoing, an embodiment herein provides a system for scanning one or more items present inside an object. The system includes a continuous conveyor belt, a first electromagnetic radiation sensor, a tunnel, a second electromagnetic radiation sensor, an electromagnetic radiation generator, a collimator, a third electromagnetic radiation sensor, a fourth electromagnetic radiation sensor and a processor. The continuous conveyor belt receives the object to be scanned and moves the object in forward direction. The first electromagnetic radiation sensor scans the object that is travelling through the continuous conveyor belt by detecting electromagnetic radiation obstructed by one or more items present inside the object and generates a first signal for profiling one or more items present inside the object. The tunnel receives the object after scanned through the first electromagnetic radiation sensor from the continuous conveyor belt that the continuous conveyor belt is extending through the tunnel. The second electromagnetic radiation sensor that is positioned inside the tunnel at entry point for sensing the presence of the object inside the tunnel by detecting electromagnetic radiation obstructed by the object and generates a second signal. The electromagnetic radiation generator that is positioned below the tunnel receives the second signal from the second electromagnetic radiation sensor to generate an angular beam of the electromagnetic radiation on the object. The electromagnetic radiation generator is inclined at an angle in the range of 10 to 50 degree with reference to the ground level on Y-axis. The collimator guides the angular beam of electromagnetic radiation generated by the electromagnetic radiation generator to the tunnel. The third electromagnetic radiation sensor that is positioned inside the tunnel at exit point senses the object when leaving the tunnel after crossing the electromagnetic radiation generator by detecting electromagnetic radiation obstructed by the object and generates a third signal to terminate the generation of angular beam of electromagnetic radiation by the electromagnetic radiation generator on the object. The fourth electromagnetic radiation sensor that is positioned above the tunnel that detects the angular beam of electromagnetic radiation that are passed through the object in three dimensions and generates a fourth signal. The fourth electromagnetic radiation sensor is inclined at an angle in the range of 10 to 50 degree with reference to the Z axis. The fourth electromagnetic radiation sensor detects angular beam of electromagnetic radiation in multiple energy bands. The processor is operably coupled with a memory unit that stores one or more instructions codes which when executed by the processor, the processor (a) receives the first signal from the first electromagnetic radiation sensor and generates profile data of the one or more items present inside the object (b) profiling one or more items present inside the object being scanned based on the profile data by determining the shape of one or more items present inside the object (c) receives the fourth signal from the fourth electromagnetic radiation sensor (d) compute an atomic mass number of one or more items present inside the object from the fourth signal to categorize one or more items present inside the object being scanned based by color mapping (e) generates composite radiation data of one or more items present inside the object from the fourth signal received from the fourth electromagnetic radiation sensor (f) modifies the composite radiation data of one or more items present inside the object by comparing the profile data of one or more items present inside the object with the composite radiation data (g) generates distortion corrected and color mapped image of one or more items present inside the object based on the modified composite radiation data and computed atomic mass number of one or more items present inside the object respectively and (h) display the distortion corrected and the color mapped image of one or more items present inside the object through a user interface.

In another embodiment, the first electromagnetic radiation sensor is an Infrared (IR) curtain.

In another embodiment, the second electromagnetic radiation sensor and the third electromagnetic radiation sensor are an IR beam sensor.

In one embodiment, the electromagnetic radiation generator emits electromagnetic radiation in a range of low and high energy levels that the low and high energy levels include in the range of 20 kiloelectron volt (keV) to 180 keV.

In another embodiment, the electromagnetic radiation generator is an X ray radiation generator.

In another embodiment, the fourth electromagnetic radiation sensor is a L shape X ray radiation sensor assembly capable of detecting X-ray radiation in multiple distinct energy bands.

In another embodiment, the category of one or more items present inside the object includes metallic, organic and inorganic.

In another aspect, a method for scanning one or more items present inside the object is provided. The method includes (i) placing the object to be scanned in a continuous conveyor belt that the continuous conveyor belt moves the object in forward direction (ii) scanning the object that is travelling through the continuous conveyor belt using a first electromagnetic radiation sensor by detecting electromagnetic radiation obstructed by one or more items present inside the object and generating a first signal for profiling one or more items present inside the object (iii) receiving the object after scanned through the first electromagnetic radiation sensor in a tunnel from the continuous conveyor belt that the continuous conveyor belt is extending through the tunnel (iv) sensing the presence of the object inside the tunnel using a second electromagnetic radiation sensor that is positioned inside the tunnel at entry point by detecting electromagnetic radiation obstructed by the object and generating a second signal (v) generating an angular beam of electromagnetic radiation on the object using an electromagnetic radiation generator that is positioned below the tunnel after receiving the second signal from the second electromagnetic radiation sensor (vi) guiding the angular beam of electromagnetic radiation generated by the electromagnetic radiation generator to the tunnel using a collimator (vii) sensing the object when leaving the tunnel after crossing the electromagnetic radiation generator using a third electromagnetic radiation sensor that is positioned inside the tunnel at exit point by detecting electromagnetic radiation obstructed by the object and generating a third signal (viii) terminating generation of the angular beam of electromagnetic radiation generated by the electromagnetic radiation generator on the object after receiving the third signal from the third electromagnetic radiation sensor (ix) detecting the angular beam of electromagnetic radiation that are passed through the object in three dimensions using a fourth electromagnetic radiation sensor that is positioned above the tunnel and generating a fourth signal; (x) receiving the first signal from the first electromagnetic radiation sensor and generating profile data of one or more items present inside the object (xi) profiling one or more items present inside the object being scanned based on the profile data by determining shape of one or more items present inside the object (xii) receiving the fourth signal from the fourth electromagnetic radiation sensor (xiii) computing an atomic mass number of one or more items present inside the object from the received fourth signal for categorizing one or more items present inside the object being scanned by color mapping (xiv) generating composite radiation data of the items present inside the object from the fourth signal received from the fourth electromagnetic radiation sensor (xv) modifying the composite radiation data by comparing the profile data of one or more items present inside the object with the composite radiation data (xvi) generating a distortion corrected and color mapped image of one or more items present inside the object based on the modified composite radiation data and computed atomic mass number of one or more items present inside the object respectively (xvii) displaying the distortion corrected and color mapped image of one or more items present inside the object through a user interface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system that works very well with the same set of components which are being used in traditional single view machines for scanning and generating three dimensional view of one or more items present inside an object. Referring now to the drawings, and more particularly to FIGS. 1A through 2C, where similar reference characters denote corresponding features consistently throughout the figures, there are shown preferred embodiments.

Figure 1A:
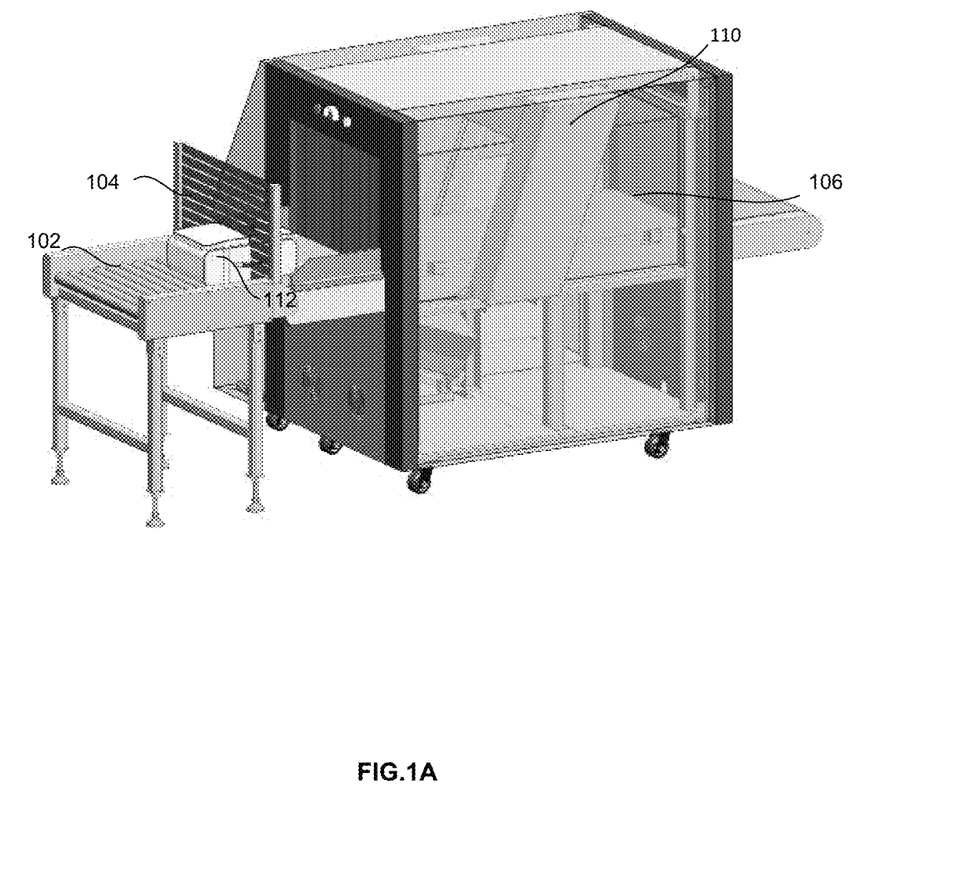
FIG. 1A illustrates a diagonal right-hand side view of a system for scanning one or more items present inside an object according to an embodiment herein.

FIG. 1A illustrates a diagonal right hand side view of a system for scanning one or more items present inside the object according to an embodiment herein. The diagonal right hand side view of the system includes a continuous conveyor belt 102, a first electromagnetic radiation sensor 104, a tunnel 106, a second electromagnetic radiation sensor (not shown in FIG. 1A), a collimator (not shown in FIG. 1A), a third electromagnetic radiation sensor (not shown in FIG. 1A), an electromagnetic radiation generator 108 (not shown in FIG. 1A), a fourth electromagnetic radiation sensor 110 and an object 112 The continuous conveyor belt 102 receives the object 112 and moves the object 112 in forward direction. The first electromagnetic radiation sensor 104 scans the object 112 that is travelling through the continuous conveyor belt 102 by detecting the electromagnetic radiation obstructed by one or more items present inside the object 112 and generating a first signal for profiling one or more items present inside the object 112. In one embodiment, the first electromagnetic radiation sensor is an IR curtain and is positioned outside the tunnel at entrance. The tunnel 106 receives the object 112 from the continuous conveyor belt 102 after scanned through the first electromagnetic radiation sensor 104. The continuous conveyor belt 102 is extending through the tunnel. The second electromagnetic radiation sensor is positioned inside the tunnel 106 at entry point. The second electromagnetic radiation sensor senses the presence of the object 112 inside the tunnel 106 by detecting the electromagnetic radiation obstructed by the object 112 and generating a second signal. In one embodiment, the second electromagnetic radiation sensor is an IR beam sensor. The electromagnetic radiation generator 108 is positioned below the tunnel 106. The electromagnetic radiation generator 108 generates an angular beam of electromagnetic radiation on the object 112 after receiving the second signal from the second electromagnetic radiation sensor. The electromagnetic radiation generator is inclined at an angle in the range of 10 to 50 degree with reference to the ground level on Y axis. In one embodiment, the electromagnetic radiation generator 108 emits electromagnetic radiation in a range of low and high energy levels. In one embodiment, electromagnetic radiation in a range of 20 keV to 180 keV. In one embodiment, the electromagnetic radiation generator 108 is an X ray generator. The collimator guides the angular beam of the electromagnetic radiation generated by the electromagnetic radiation generator 108 to the tunnel 106. The third electromagnetic radiation sensor is positioned inside the tunnel 106 at exit point. The third electromagnetic radiation sensor senses the object 112 when leaving the tunnel 106 after crossing the electromagnetic radiation generator 108 and generates a third signal to terminate the generation of angular beam of electromagnetic radiation on the object 112 by the electromagnetic radiation generator 108. The fourth electromagnetic radiation sensor 110 is positioned above the tunnel 106. The fourth electromagnetic radiation sensor 110 detects the angular beam of electromagnetic radiation that are passed through the object 112 in three dimensions and generates a fourth signal. The fourth electromagnetic radiation sensor 110 is inclined at an angle in the range of 10 to 50 degree with reference to the Z axis and detects electromagnetic radiation at multiple energy bands. In one embodiment, the fourth electromagnetic radiation sensor is a L shape X ray radiation detection sensor assembly. The system includes a processor that is coupled with a memory unit that stores one or more instruction codes which when executed by the processor, the processor (i) receives the first signal from the first electromagnetic radiation sensor 104 and generates profile data of the items present inside the object 112 (ii) profiles one or more items present inside the object 112 being scanned based on the profile data by determining shape of one or more items present inside the object 112 (iii) receive the fourth signal from the fourth electromagnetic radiation sensor 110 (iv) compute an atomic mass number of one or more items present inside the object 112 from the fourth signal to categorize one or more items present inside the object 112 being scanned by color mapping (v) generate a composite radiation data of one or more items present inside the object 112 from the fourth signal received from the fourth electromagnetic radiation sensor (vi) modify the composite radiation data by comparing the profile data of one or more items present inside the object 112 with the composite radiation data (vii) generate distortion corrected and color mapped image of one or more items present inside the object 112 based on the modified composite radiation data and computed atomic mass number of one or more items present inside the object 112 respectively (viii) display distortion corrected and color mapped image of one or more items present inside the object 112 through a user interface.

In one embodiment, the categories of one or more items present inside the object 112 includes metallic, organic and inorganic.

Figure 1B:
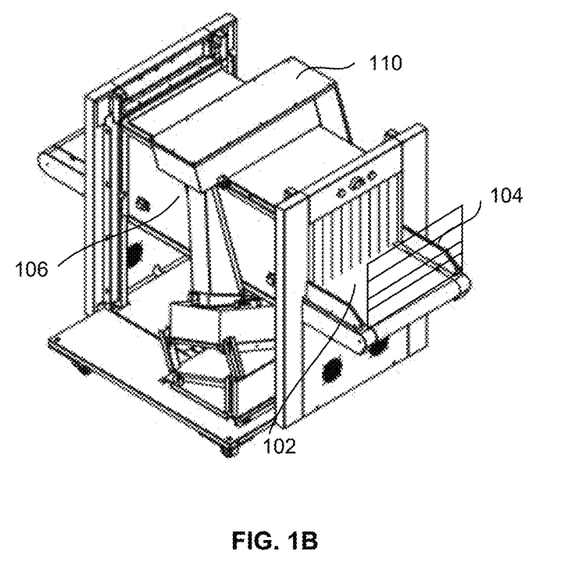
FIG. 1B illustrates a diagonal left-hand side view of the system for scanning one or more items present inside the object according to an embodiment herein.

FIG. 1B illustrates a diagonal left-hand side view of the system for scanning one or more items present inside the object 112 according to an embodiment herein. The diagonal left-hand side view of the system includes the continuous conveyor belt 102, the first electromagnetic radiation sensor 104, the tunnel 106 and the fourth electromagnetic radiation sensor 110. The function of these components has been explained above.

Figure 1C:
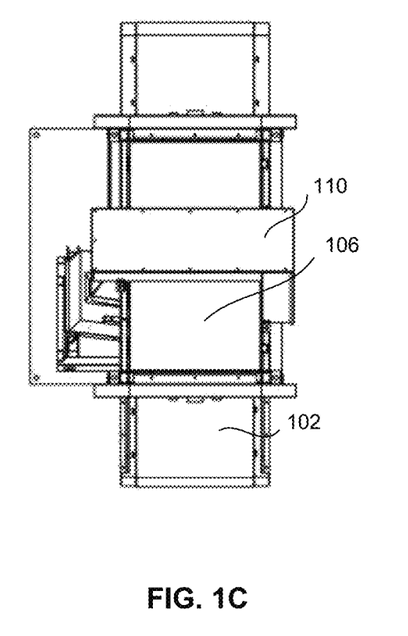
FIG. 1C illustrates a top view of the of the system for scanning one or more items present inside the object according to an embodiment herein.

FIG. 1C illustrates a top view of the system for scanning one or more items present inside the object 112 according to an embodiment herein. The top view of the system includes the continuous conveyor belt 102, the tunnel 106 and the fourth electromagnetic radiation sensor 110. The function of these components has been explained above.

Figure 1D:
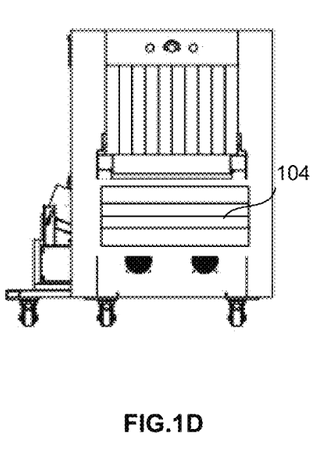
FIG. 1D illustrates a front view of the system for scanning one or more items present inside the object according to an embodiment herein.

FIG. 1D illustrates a front view of the system for scanning one or more items present inside the object 112 according to an embodiment herein. The front view of the system includes the first electromagnetic radiation sensor 104. The function of these components has been explained above.

Figure 1E:
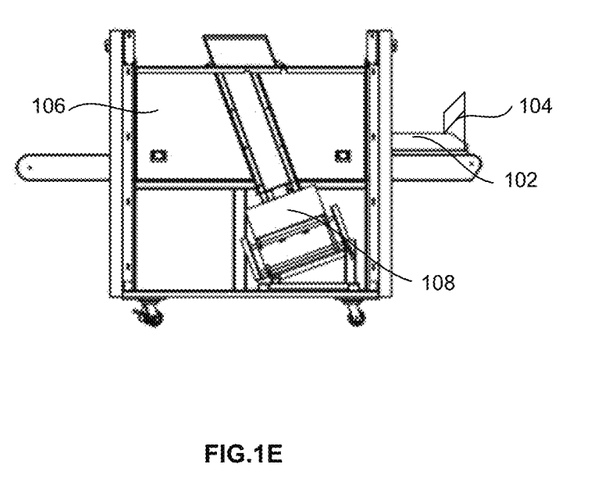
FIG. 1E illustrates a left-hand side view of the system for scanning one or more items present inside the object showing electromagnetic radiation generator placement according to an embodiment herein.

FIG. 1E illustrates a right-hand side view of the system for scanning one or more items present inside the object 112 showing an electromagnetic radiation generator placement according to an embodiment herein. The right-hand side view of the system includes the continuous conveyor belt 102, the first electromagnetic radiation sensor 104, the tunnel 106 and the electromagnetic radiation generator 108. The function of these components has been explained above.

Figure 1F:
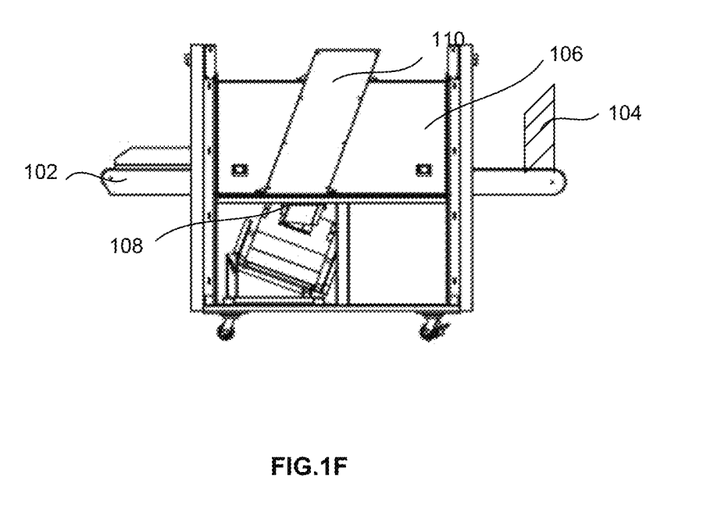
FIG. 1F illustrates a right-hand side view of the system for scanning one or more items present inside the object showing electromagnetic radiation generator placement according to an embodiment herein.

FIG. 1F illustrates a left-hand side view of the system for scanning one or more items present inside the object 112 showing an electromagnetic radiation generator placement according to an embodiment herein. The left-hand side view of the system includes the continuous conveyor belt 102, the first electromagnetic radiation sensor 104, the tunnel 106, the electromagnetic radiation generator 108, and the fourth electromagnetic radiation sensor 110. The function of these components has been explained above.

Figure 2A:
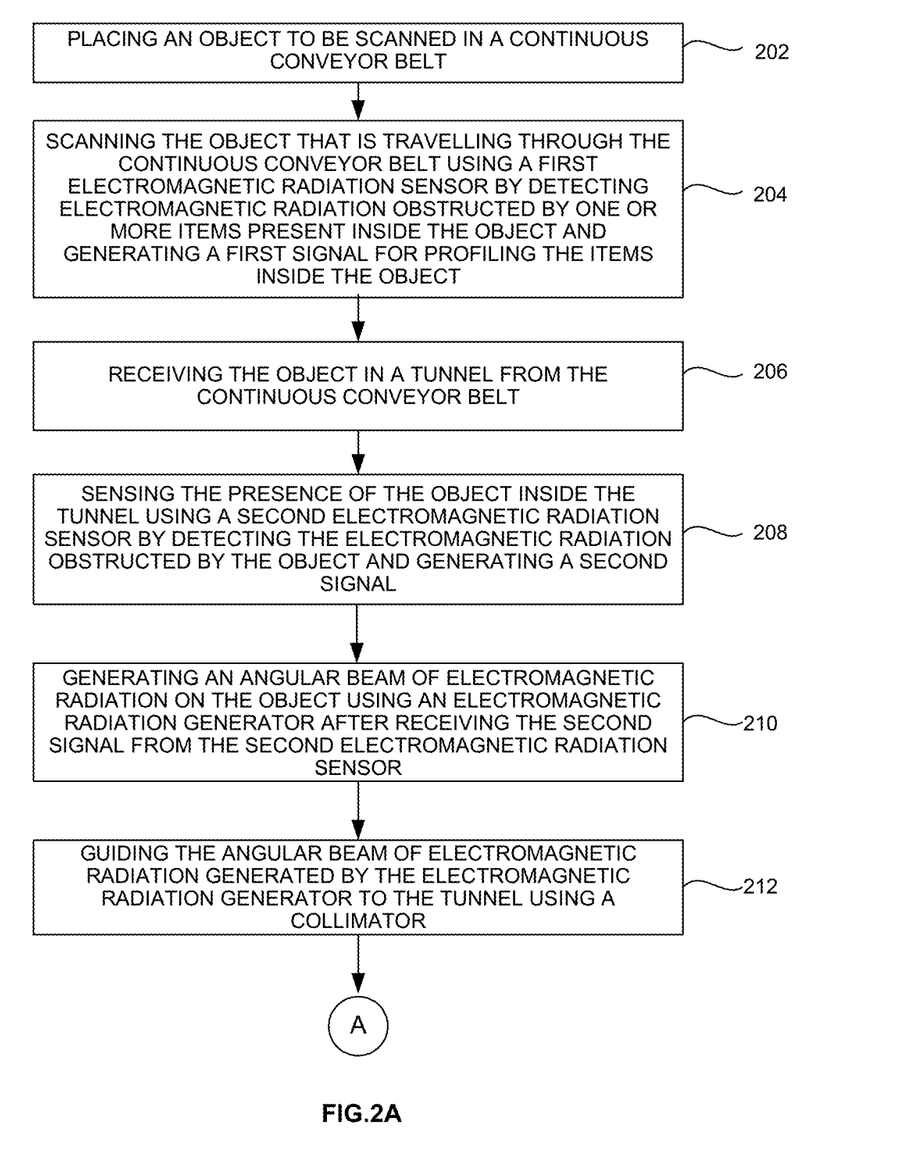
FIGS. 2A-2C are flow diagrams that illustrate a method of scanning one or more items present inside the object according to an embodiment herein.
Figure 2B:
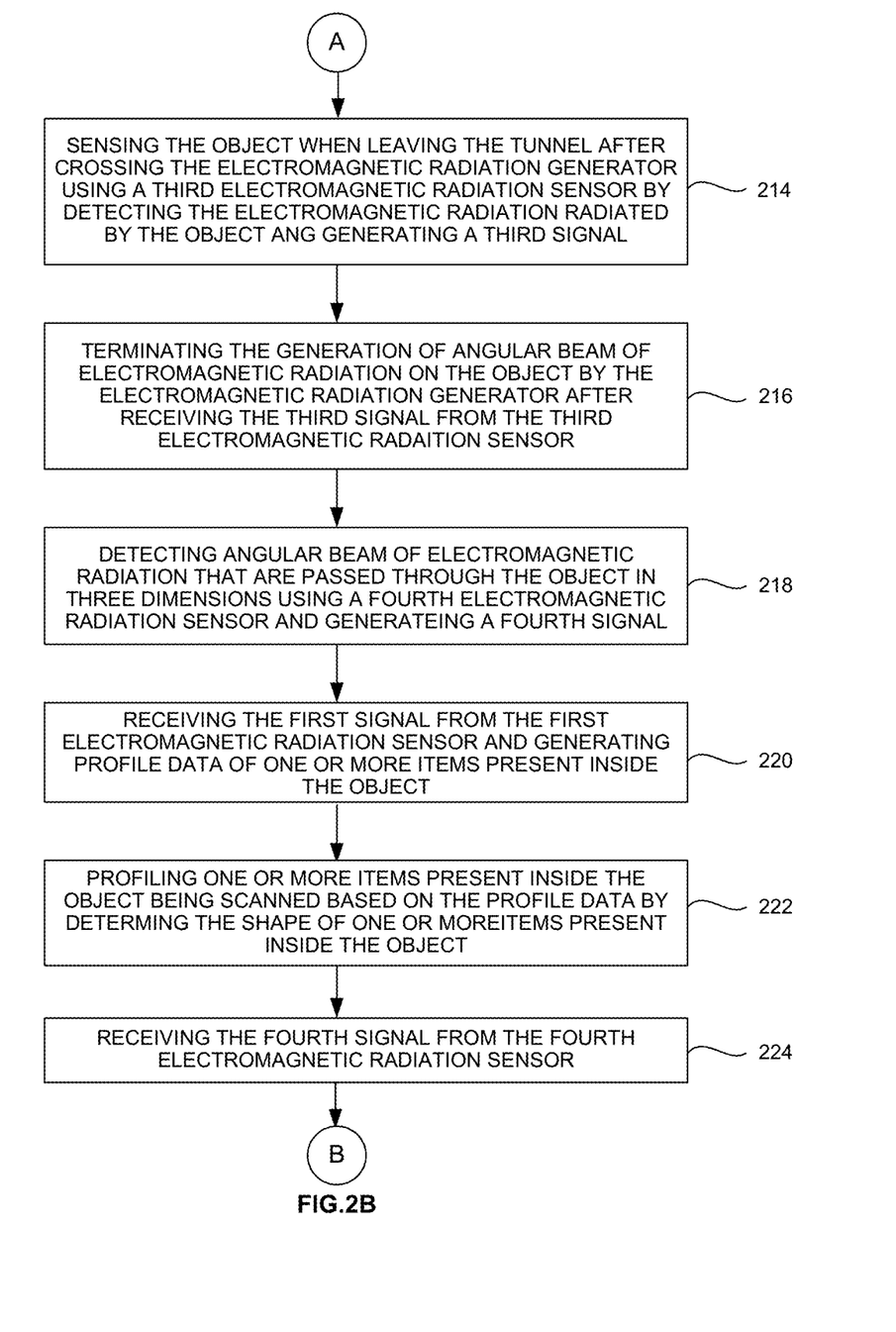
Figure 2C:
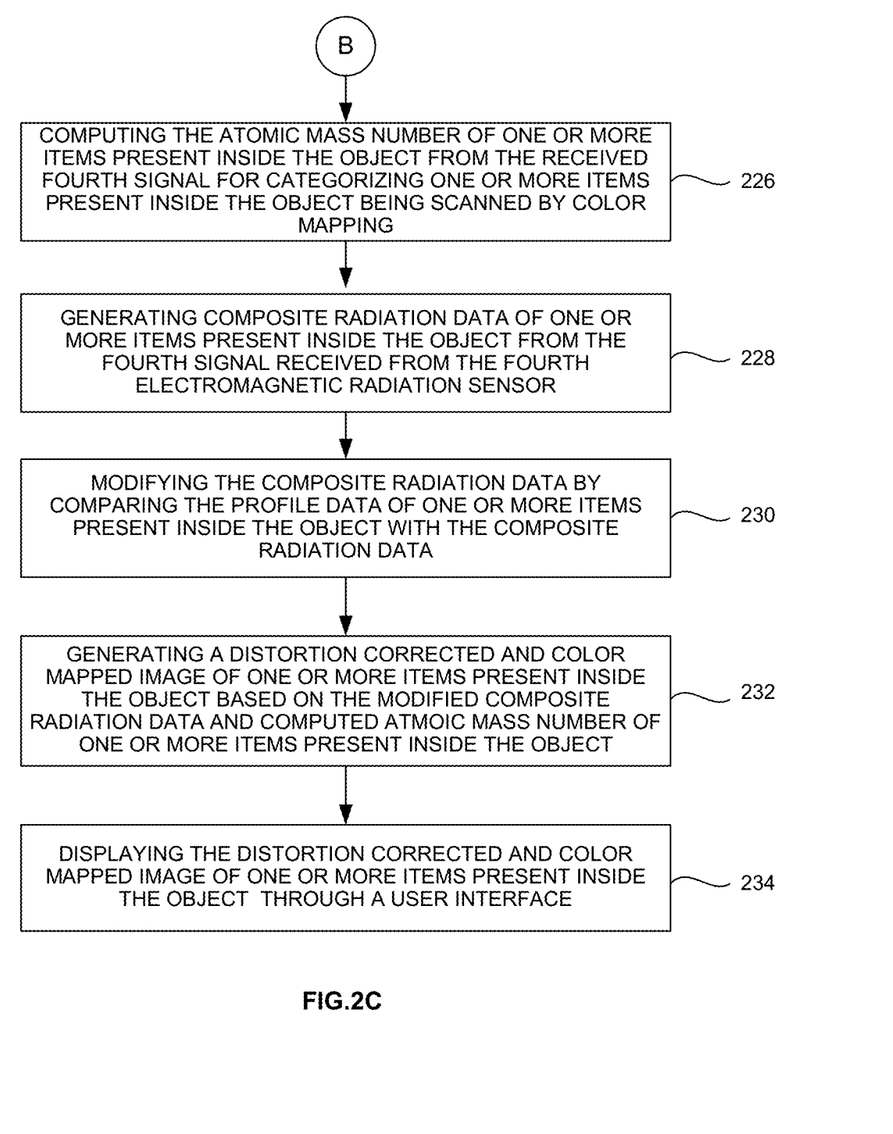

FIGS. 2A-2C are flow diagrams that illustrate a method of scanning one or more items present inside an object 112 according to an embodiment herein. At step 202, the object 112 to be scanned is placed in the continuous conveyor belt 102 to move the object 112 in forward direction. At step 204, the object 112 is scanned using the first electromagnetic radiation sensor 104 by detecting electromagnetic radiation obstructed by one or more items present inside the object 112 and a first signal is generated for profiling one or more items present inside the object 112. At step 206, the object 112 from the continuous conveyor belt 102 is received in the tunnel 106 and the continuous conveyor belt 102 is extended through the tunnel 106. At step 208, the presence of the object 112 inside the tunnel 106 is sensed using a second electromagnetic radiation sensor by detecting electromagnetic radiation obstructed by the object 112 and a second signal is generated. At step 210, angular beam of electromagnetic radiation is generated on the object 112 using the electromagnetic radiation generator 108 after receiving the second signal from the second electromagnetic radiation sensor. At step 212, angular beam of electromagnetic radiation is guided to the tunnel 106 using a collimator. At step 214, the object 112 when leaving the tunnel 106 after crossing the electromagnetic radiation generator 108 is sensed using a third electromagnetic radiation sensor and a third signal is generated. At step 216, the generation of the electromagnetic radiation on the object 112 is terminated by electromagnetic radiation generator 108 after receiving the third signal from the third electromagnetic radiation sensor. At step 218, the angular beam of electromagnetic radiation that are passed through the object 112 in three dimensions is detected using a fourth electromagnetic radiation sensor 110 and a fourth signal is generated. At step 220, the first signal from the first electromagnetic radiator sensor 104 is received and profile data for one or more items present inside the object 112 is generated. At step 222, profile of one or more items present inside the object 112 being scanned is generated based on profile data by determining the shape of one or more items present inside the object 112. At step 224, the fourth signal from the fourth electromagnetic radiation sensor 110 is received. At step 226, an atomic mass number of one or more items present inside the object 112 is computed based on the fourth signal from the fourth electromagnetic radiation sensor 110 to categorize one or more items present inside the object 112. At step 228, the composite radiation data of one or more items present inside the object is generated from the fourth signal received from the fourth electromagnetic radiation sensor. At step 230, modified composite radiation data is generated by comparing the profile data of one or more items present inside the object 112 with composite radiation data. At step 232, a distortion corrected and color mapped image of one or more items present inside the object is generated based on the modified composite radiation data and the computed atomic number of one or more items present inside the object 112 respectively. At step 234, the distortion corrected and color mapped image of one or more items present inside the object 112 is displayed through a user interface. In one embodiment, the first electromagnetic radiation sensor 104 is an IR curtain. In one embodiment, the second electromagnetic radiation sensor is an IR beam sensor. In one embodiment, the second electromagnetic radiation sensor is positioned inside the tunnel 106 at entry point. In one embodiment, the electromagnetic radiation generator 108 emits electromagnetic radiation in a range of low and high energy levels. In one embodiment, the electromagnetic radiation generator 108 emits electromagnetic radiation in a range of 20 keV to 180 keV. In one embodiment, the electromagnetic radiation generator 108 is an X ray generator. In one embodiment, the third electromagnetic radiation sensor is an IR beam sensor. In one embodiment, the fourth electromagnetic radiation sensor is a L shape X ray radiation detection sensor assembly that detects X ray radiation in multiple distinct energy bands.

In one embodiment, the object 112 is a baggage.

In one embodiment, the system scans the baggage to determine one or more items present inside the baggage along with their categories according to an embodiment herein.

This robust, ergonomically designed scanning system is very easy to use and allows the operator to make quick and correct decisions. Hence, the throughput of the system increases and incidences of false or missed alarms decreases.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for scanning a plurality of items present inside an object to generate a distortion corrected and color mapped image of the plurality of items, the system comprising:
   a first electromagnetic radiation sensor detects electromagnetic radiation obstructed by the plurality of items inside the object that is travelling through a continuous conveyor belt and generates a first signal for profiling the plurality of items present inside the object;
   a second electromagnetic radiation sensor that is positioned inside a tunnel at entry point, wherein the second electromagnetic radiation sensor senses a presence of the object inside the tunnel, wherein the second electromagnetic radiation sensor detects the electromagnetic radiation obstructed by the object and generates a second signal;
   an electromagnetic radiation generator that is positioned below the tunnel that receives the second signal from the second electromagnetic radiation sensor to generate an angular beam of electromagnetic radiation on the object, wherein the electromagnetic radiation generator is inclined at an angle in the range of 10 to 50 degree with reference to the ground level on Y axis;
   a third electromagnetic radiation sensor that is positioned inside the tunnel at an exit point, wherein the third electromagnetic radiation sensor senses the object when leaving the tunnel after crossing the electromagnetic radiation generator, wherein the third electromagnetic radiation sensor detects the electromagnetic radiation obstructed by the object and generates a third signal to trigger the electromagnetic radiation generator to terminate the generation of the angular beam of electromagnetic radiation on the object;
   a fourth electromagnetic radiation sensor that is positioned above the tunnel that detects the angular beam of electromagnetic radiation that are passed through the object in three dimensions and generates a fourth signal, wherein the fourth electromagnetic radiation sensor is inclined at an angle in the range of 10 to 50 degree with reference to the Z axis;
   a processor; and a memory unit operably coupled to the processor, wherein the memory unit stores a plurality of instruction codes which when executed by the processor, wherein the processor is configured to, generate profile data of the plurality of items present inside the object by processing the first signal received from the first electromagnetic radiation sensor;

determine a shape of the plurality of items present inside the object by profiling the plurality of items with the profile data;

categorize the plurality of items present inside the object being scanned by color mapping by computing an atomic mass number of the plurality of items that is determined from the fourth signal received from the fourth electromagnetic radiation sensor, wherein the category of plurality of items comprises metallic, organic, inorganic;

generate a distortion corrected and color mapped image of the plurality of items present inside the object by (a) generating composite radiation data of the plurality of items present inside the object from the fourth signal received from the fourth electromagnetic radiation sensor, (b) modifying the composite radiation data of the plurality of items present inside the object by comparing the profile data of the plurality of items present inside the object with the composite radiation data, and (c) processing the computed atomic mass number of the plurality of items present inside the object respectively; and display the distortion corrected and the color mapped image of the plurality of items present inside the object through a user interface.

2. The system as claimed in claim 1, wherein the continuous conveyor belt that receives the object to be scanned and moves the object in a forward direction, wherein the tunnel that receives the object from the continuous conveyor belt after scanned through the first electromagnetic radiation sensor, wherein the continuous conveyor belt is extending through the tunnel, wherein the system comprises a collimator that guides the angular beam of electromagnetic radiation generated by the electromagnetic radiation generator to the tunnel.

3. The system as claimed in claim 1, wherein the first electromagnetic radiation sensor is an IR curtain, and the second electromagnetic radiation sensor and the third electromagnetic radiation sensor are an IR beam sensor.

4. The system as claimed in claim 1, wherein the electromagnetic radiation generator emits electromagnetic radiation in a range of low and high energy levels, wherein the low and high energy levels comprise in the range of 20 keV to 180 keV.

5. The system as claimed in claim 1, wherein the electromagnetic radiation generator is an X ray radiation generator.

6. The system as claimed in claim 1, wherein the fourth electromagnetic radiation sensor is an X ray radiation detection sensor assembly, wherein the X ray detection sensor assembly detects X ray radiation in multiple distinct energy bands, wherein the fourth electromagnetic radiation sensor detects angular beam of electromagnetic radiation in multiple energy bands.

7. A method of scanning a plurality of items present inside an object to generate a distortion corrected and color mapped image of the plurality of items, the method comprising;

placing the object to be scanned in a continuous conveyor belt to move the object in a forward direction;

detecting, using a first electromagnetic radiation sensor, electromagnetic radiation obstructed by the plurality of items present inside the object that is travelling through the continuous conveyor belt and generating a first signal for profiling the plurality of items present inside the object;

receiving the object after scanned through the first electromagnetic radiation sensor in a tunnel from the continuous conveyor belt, wherein the continuous conveyor belt is extending through the tunnel;

sensing a presence of the object inside the tunnel using a second electromagnetic radiation sensor that is positioned inside the tunnel at entry point by detecting electromagnetic radiation obstructed by the object and generating a second signal;

generating an angular beam of electromagnetic radiation on the object using an electromagnetic radiation generator that is positioned below the tunnel after receiving the second signal from the second electromagnetic radiation sensor, wherein the electromagnetic radiation generator is inclined at an angle in the range of 10 to 50 degree with reference to the ground level on Y axis;

guiding the angular beam of electromagnetic radiation generated by the electromagnetic radiation generator to the tunnel using a collimator;

sensing the object when leaving the tunnel after crossing the electromagnetic radiation generator using a third electromagnetic radiation sensor that is positioned at exit point of the tunnel by detecting electromagnetic radiation obstructed by the object and generating a third signal;

terminating generation of the angular beam of electromagnetic radiation by the electromagnetic radiation generator on the object after receiving the third signal from the third electromagnetic radiation sensor;

detecting the angular beam of electromagnetic radiation that are passed through the object using a fourth electromagnetic radiation sensor that is positioned above the tunnel;

the method comprises, generating a first signal for profiling the plurality of items present inside the object using the first electromagnetic radiation sensor;

generating a second signal by detecting electromagnetic radiation obstructed by the object using the second electromagnetic radiation sensor;

receiving the second signal by the electromagnetic radiation generator from the second electromagnetic radiation sensor, wherein the electromagnetic radiation generator is inclined at an angle in a range of 10 to 50 degree with reference to a ground level on Y axis;

generating a third signal by detecting electromagnetic radiation obstructed by the object using the third electromagnetic radiation sensor;

terminating generation of the angular beam of electromagnetic radiation by the electromagnetic radiation generator on the object after receiving the third signal from the third electromagnetic radiation sensor;

generating a fourth signal by detecting the angular beam of electromagnetic radiation passed through the object in three dimensions using the fourth electromagnetic radiation sensor, wherein the fourth electromagnetic radiation sensor inclined at an angle in a range of 10 to 50 degree with reference to Z axis, wherein the fourth electromagnetic radiation sensor detects the angular beam of electromagnetic radiation in multiple energy bands;

generating profile data of the plurality of items present inside the object by processing the first signal from the first electromagnetic radiation sensor;

determining a shape of the plurality of items present inside the object by profiling the plurality of items with the profile data;

categorizing the plurality of items present inside the object being scanned by color mapping by computing an atomic mass number of the plurality of items that is determined from the fourth signal received from the fourth electromagnetic radiation sensor, wherein the category of plurality of items comprises metallic, organic, inorganic;

generating a distortion corrected and color mapped image of plurality of items present inside the object by (a) generating composite radiation data of the plurality of items present inside the object from the fourth signal received from the fourth electromagnetic radiation sensor, (b) modifying the composite radiation data of the plurality of items present inside the object by comparing the profile data of the plurality of items present inside the object with the composite radiation data, and (c) processing the computed atomic mass number of the plurality of items present inside the object respectively; and displaying the distortion corrected and color mapped image of the plurality of items present inside the object through a user interface.

* * * * *